United States Patent [19]

Rieder

[11] Patent Number: 5,450,199
[45] Date of Patent: Sep. 12, 1995

[54] PHOTOELECTRIC POSITION INDICATOR WITH A LIGHT-DIRECTING PHASE GRATING

[75] Inventor: Heinz Rieder, Oberndorf, Austria

[73] Assignee: RSF-Elektronic Gesellschaft m.b.H., Tarsdorf, Austria

[21] Appl. No.: 184,254

[22] Filed: Jan. 18, 1994

[30] Foreign Application Priority Data

Jan. 21, 1993 [AT] Austria ........................ 83/93

[51] Int. Cl.$^6$ .............................................. G01B 11/02
[52] U.S. Cl. .................................. 356/356; 356/363; 250/237 G
[58] Field of Search .......................... 356/356, 363; 250/237 G

[56] References Cited

U.S. PATENT DOCUMENTS

| | | | |
|---|---|---|---|
| 2,886,718 | 5/1959 | Shepherd et al. | 250/237 G |
| 4,049,965 | 9/1977 | Pettigrew | 250/237 G |
| 4,091,281 | 5/1978 | Willhelm et al. | 250/237 G |
| 4,231,662 | 11/1980 | Feinland et al. | 250/237 G |
| 5,000,572 | 3/1991 | Nose et al. | 356/356 |
| 5,064,290 | 12/1991 | McMurtry et al. | 356/356 |
| 5,066,129 | 11/1991 | Matsui | 356/356 |
| 5,264,915 | 11/1993 | Huber et al. | 356/356 |

FOREIGN PATENT DOCUMENTS 4132941  4/1993  Germany .................... 356/356

*Primary Examiner*—Samuel A. Turner
*Assistant Examiner*—Jason D. Eisenberg
*Attorney, Agent, or Firm*—Collard & Roe

[57] ABSTRACT

A photoelectric position indicator comprises a scale phase grating, and a scanning unit movable along a measuring direction and comprising a scanning phase grating, which is movable relative to the scale phase grating, a light source, a collimator, and photodetectors, which from the interference patterns formed by the light diffracted by the gratings receive groups having a predetermined order of diffraction and produce periodic phase-displaced actual-value signals in dependence on the orders of diffraction of said groups during a movement of the scanning unit relative to the scale phase grating. To ensure a generation of signals which can easily be evaluated and to permit larger assembling tolerances, the scanning unit comprises a light-directing phase grating arranged to fan the light from the light source transverse to the measuring direction so as to form component light beams, and the photodetectors receive the groups of the interference patterns generated by one of the component light beams.

7 Claims, 3 Drawing Sheets

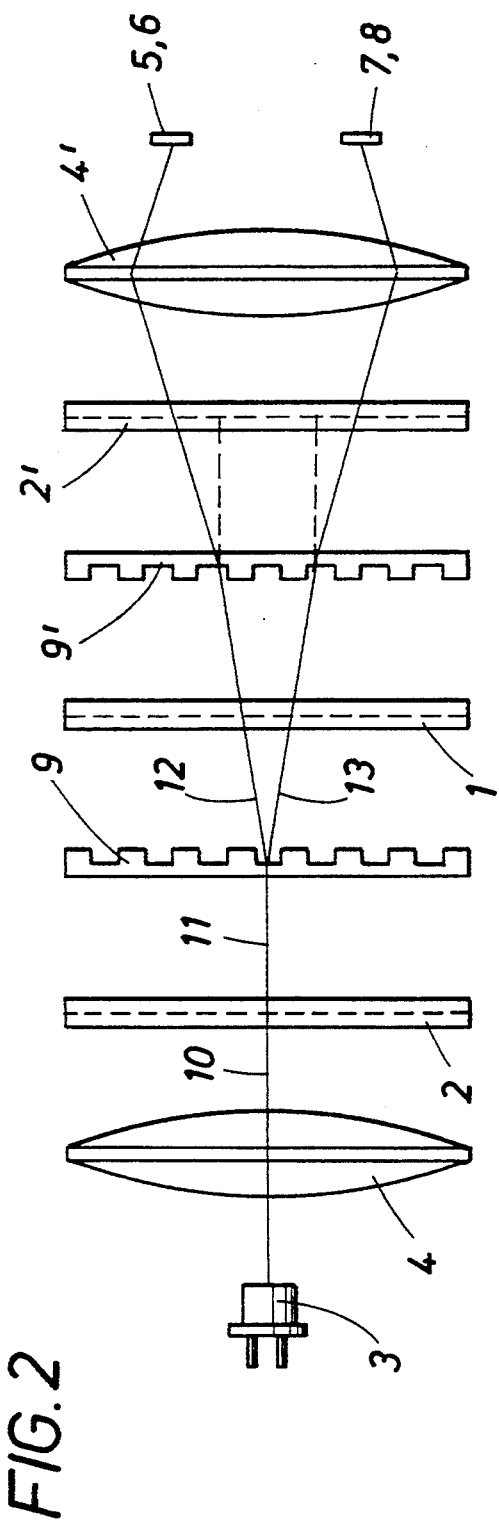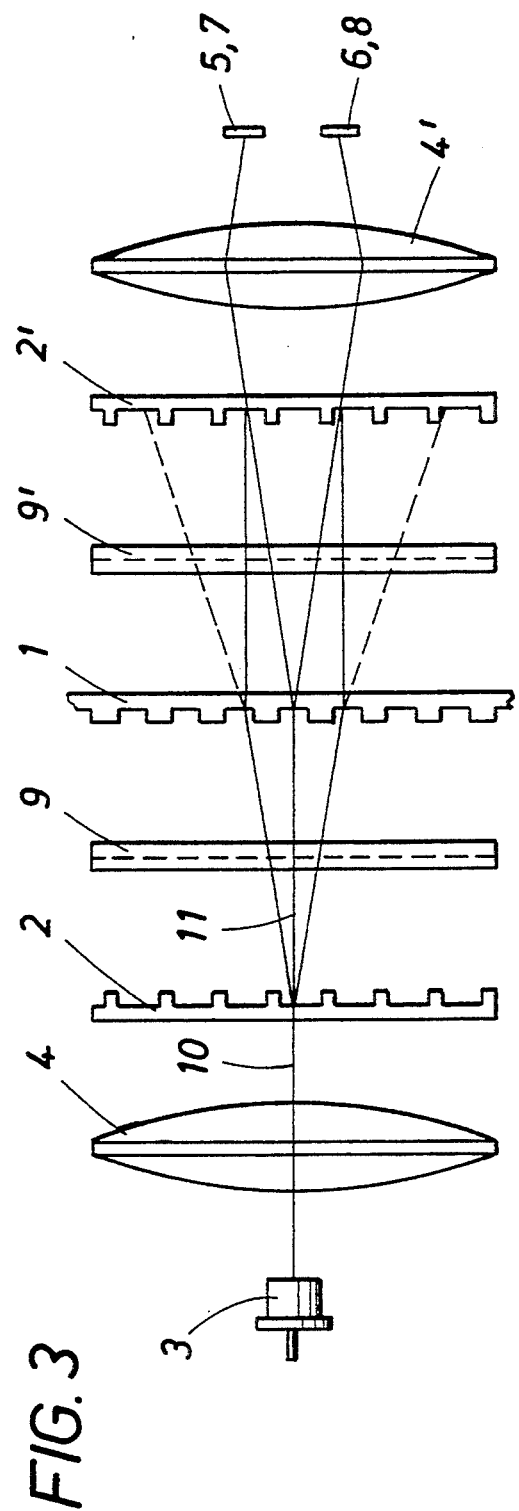

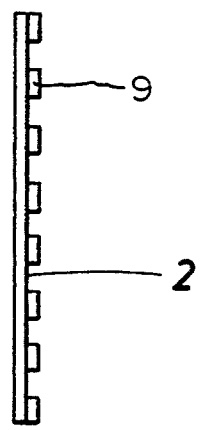
FIG. 4
FIG. 5
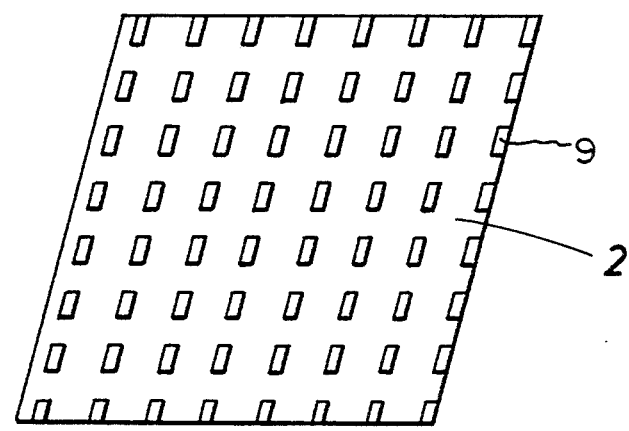

PHOTOELECTRIC POSITION INDICATOR WITH A LIGHT-DIRECTING PHASE GRATING

BACKGROUND OF THE INVENTION

1. Field of the Invention

This invention relates to a photoelectric position indicator comprising a scale phase grating, and a scanning unit comprising at least one scanning phase grating, which is movable relative to the scale phase grating, at least one light source, which is movable in unison with the scanning phase grating or gratings and a collimator, and photodetectors. Interference patterns having groups having a predetermined order of diffraction are generated by the light which has been diffracted several times during a movement of the scanning unit along a measuring direction, and produce periodic phase-displaced actual-value signals on the photodetectors in dependence on the orders of diffraction of said groups during a movement of the scanning phase grating or gratings and the scale phase grating relative to each other.

2. Description of the Prior Art

Such a position indicator is known from EP-A-0 509 979. In the operation of such position indicators, the principle of the so-called three-grating triple-diffraction pick-up is adopted, the Fundamentals of which have been explained in detail in the dissertation by J. Wilhelm "Dreigitterschrittgeber-photoelektrische Aufnehmer zur Messung von Lageänderungen" (Hanover University of Technology) published in 1978. If reflecting phase gratings are used as a scale, the light will be diffracted twice by the scanning phase grating. If a transparent scale is employed, another scanning phase grating may be provided on the second side of the scale. Finally, the light which has been diffracted by the first scanning phase grating and the transparent scale may be directed by a deflecting prism provided on the rear side of the scale along a portion of the length of the scale and then through the scale and a further scanning grating to the detectors; in that case the light is diffracted twice by the scale.

In accordance with EP-A-0 509 979 signal pairs which are displaced 90° in phase and comprise each two phase-opposed signals are generated and for that purpose the scale member is provided with two juxtaposed scale tracks, which are offset by ¼ of the grating increment. The scanning grating is common to both scale tracks and two photodetectors are associated with each scale track and serve to receive the interference patterns of the light beams which have been diffracted in that direction so that the signals of the pairs of signals can be combined in antiparallel connections for the generation of analog actual-value signals which lead or lag relative to each other in dependence on the direction of movement. In that case it is possible to use evaluating circuits which are similar to those used in conventional incremental measuring systems.

In all three-grating triple-diffraction pick-ups of the previous type, phase errors may occur, particularly owing to pitch errors of the several gratings and/or tolerances regarding the mounting of the scanning gratings relative to the scale grating or gratings. For this reason, time-consuming adjusting work is required to ensure a generation of useful signals as a result of the measurement.

In order to control the phase error and nevertheless to generate signal pairs which can be evaluated and have a suitable phase offset, a measuring system disclosed in Patent Abstracts of Japan, Vol. 7, No. 10 (P-168) (1155) of Jan. 14, 1983, and JP-A-57 169 613 comprises a phase grating as a scale and two measuring systems, which are coupled to each other and consist each of a light source, a collimator, scanning phase gratings and photodetectors. At least the light source of the one measuring system or one entire measuring system can be adjusted relative to the other measuring system in the direction of the scanning movement. That design is highly expensive and has the basic disadvantage that the two measuring systems necessarily process signals from scale points which are longitudinally spaced a large distance apart and may possibly be different owing to pitch errors.

SUMMARY OF THE INVENTION

It is an object of the invention to provide a position indicator which is of the kind described first hereinbefore and permits large tolerances regarding the assembling in automatic production and permits a simple adjustment for a compensation of phase errors.

The object set forth is basically accomplished that at least one light directing optical means is included in the light path and fans the diffracted light beam transversely to the direction of the diffraction effected by the scale phase grating and the scanning phase grating or gratings, and separate photodetectors are provided for receiving groups which have been diffracted in the same direction from the component light beams.

On principle, the position indicator in accordance with the invention permits the use of simple scale and scanning gratings and nevertheless generates the desired phase-displaced signal pairs and it is possible to generate even the phase-displaced signals pairs during a scanning of the scale phase grating at directly adjoining or merging locations.

According to a desirable feature the light-directing optical means consist of a phase grating having grooves and lands which extend at right angles to those of the scale phase grating and the scanning phase grating or gratings. The fanning of the light beam by the light-directing phase grating is preferably restricted to such an extent that in a three-grating triple-diffraction pick-up of usual type the areas in which the component light beams are incident will merge and the interference patterns at the photodetectors are sufficiently spaced apart.

According to preferred feature the light-directing phase grating has a land width to groove width ratio of 1:1 and the groove depth corresponds to the wavelength of the light employed so that the light-directing phase grating diffracts light predominantly in the diffraction directions of +1st and −1st orders.

Compared to the design in accordance with EP-A-509 979 the photoelectric position indicator described as described hereinbefore affords the advantage that the elimination of the second scale track on the scale member simplifies the overall arrangement and that the accuracy is increased because the effect of canting errors of the scanning unit will be decreased as closely adjacent regions of the scale are scanned in a scanning zone which is substantially unaffected by canting. For this reason a single-field push-pull scanning is substantially effected.

To permit a compensation of any still occurring phase errors, which may particularly be due to clearance tolerances, a further feature resides in that the light-directing phase grating is adjustable by a rotation about an axis which is not normal to the principal plane of the light-directing phase grating. On principle, the light-directing phase grating may be disposed between the scanning phase grating and the scale phase grating to that the light-directing phase grating will diffract the light twice if the scale phase grating is reflective. In an alternative arrangement the light-directing phase grating may be disposed between the light source and the collimator or between the collimator and the scanning phase grating.

The overall arrangement may be simplified in that, according to a further feature, the light-directing phase grating is combined with the or one scanning phase grating to form a crossed grating, the grating lines of which preferably cross at an angle which differs from 90°, such as 45°, if the light is diffracted twice at such grating, as has been mentioned hereinbefore.

The invention is not restricted to the use of light-directing phase gratings as light-directing optical means. A wedge-shaped prism or other similar light-directing means may be used to fan the light beam into component beams.

As has been indicated hereinbefore, it is desirable to provide light-directing optical means which diverge the component light beams only to such an extent that they are incident on the scale phase grating in substantially overlapping areas.

Further details and features of the invention will become apparent from the following description of the drawings.

BRIEF DESCRIPTION OF THE DRAWINGS

FIG. 2 is a side elevation related to FIG. 1.

FIG. 3 is a top plan view related to FIG. 2.

FIG. 4 is a side elevation showing a scanning phase grating combined with a light-directing phase grating to form a crossed grating.

FIG. 5 is a plan view of FIG. 4, seen from the side of the grooves.

DETAILED DESCRIPTION OF THE PREFERRED EMBODIMENT

Figure 1:
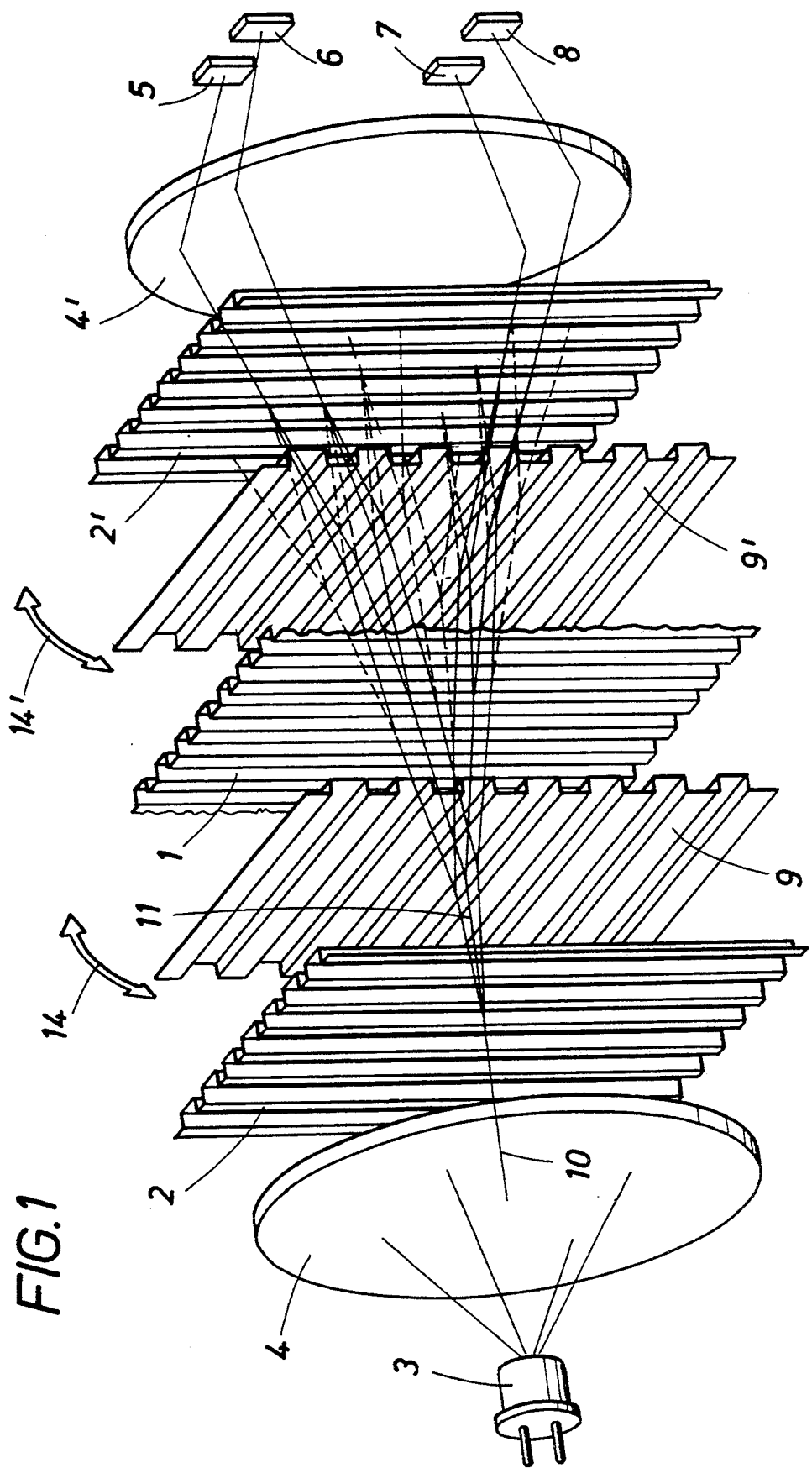
FIG. 1 is a schematic perspective view showing the basic arrangement of a photoelectric position indicator in accordance with the invention. To illustrate the mode of operation more clearly, the scanning phase grating, the light-directing phase grating and the collimator are shown also on the rear side of the scale phase grating, which is assumed to be reflecting. As a result, the entire light path is unfolded.

An illustrative embodiment of the invention is shown in the drawings.

On principle there are provided scale phase grating 1, which extends continuously throughout the length or periphery of a range of measurement, a scanning phase grating 2, 2', at least one light source 3, and a collimator 4, 4', as well as photodetectors 5, 6 and 7, 8. With the exception of the special arrangement of the photodetectors 5 to 8 the measuring system described thus far corresponds to the known three-grating triple-diffraction pick-up. The light source 3 may consist of a light-emitting diode, an incandescent lamp or a laser. The scale phase grating is a reflecting phase grating having a predetermined land width to groove width ratio. The land width to groove width ratio of the scanning grating 2, 2' differs distinctly from 1:1. A light-directing phase grating 9, 9' is disposed between the scanning grating 2, 2' and the scale phase grating 1 and has, e.g., a land width to groove width ratio of 1:1 and a groove depth corresponding to the wavelength of the light employed so that the light is mainly diffracted in the diffraction directions of the +1st and −1st orders. As shown in FIGS. 4 and 5, scanning phase grating 2 may be combined with light-directing phase grating 9, the grooves of the gratings crossing each other at an angle differing from 90°, defining rhomboid fields therebetween.

For a measurement, the light ray 10 which has been collimated by the collimator 4 is initially diffracted by the scanning phase grating 2 and the resulting simple light beam 11 as it passes through the light-directing phase grating 9 is fanned to form two component light beams 12, 13 (designated only in FIG. 2). With a small center distance said component beams are incident on the scale phase grating 1 and by the latter are reflected and diffracted to the grating 9', where they are diffracted once more and are again diffracted by the scanning phase grating 2' to fall through the collimator 4' onto the photodetectors 5, 6 and 7, 8, respectively. Because the light-directing phase grating has a land width to groove width ratio of 1:1 and a groove width corresponding to the wavelength of the light employed and the land width to groove width ratio of the scanning phase grating 2 and of the scale phase grating 1 is properly selected, it is achieved in the illustrated embodiment that the photodetectors 5 and 6 and 7 and 8 receive the interferences of the component beams 12, 13 which have been diffracted and at each of the two pairs 5, 6 and 7, 8 have a desired phase displacement of 180°. The signals generated by each of the pairs 5, 6 and 7, 8, respectively, are displaced 90° in phase from the signals generated by the other of said pairs. In case of a proper adjustment the phase-opposed signals which are generated by the photodetectors 5, 7 and 6, 8 respectively, may be delivered to an antiparallel connection to produce two basically sinusoidal analog actual-value signals, which are displaced 90° in phase and during a displacement of the scanning unit comprising the components 2 and 9 relative to the scale one of said signals will lead or lag the other in dependence on the direction of said displacement so that said signals can be used to control counting or control means in dependence on the direction of movement.

It is indicated by arrows 14, 14' in FIG. 1 that the light-directing phase grating can be adjusted by a rotation about an axis which is normal to the principal plane of that grating. Such an adjustment will change the division of the light into the component beams 12, 13, the center distance between the areas on which they are incident on the scale phase grating 1 and the phase displacement of the signals generated by the detectors 5 to 8. The rotational adjustment of the light-directing phase grating 9 may be effected as the measuring system is assembled. Alternatively a monitoring circuit may be provided, which monitors the phase displacement between the signals generated by the detectors 5 to 8 and optionally monitors also the signal amplitude or the relative signal amplitude and in response to a deviation from the adjusted setpoint initiates the operation of a drive for rotating the light-directing phase grating 9. In addition to the angular adjustment in the sense indicated by the arrow 14 it would be possible to adjust the gratings 2 and 2' relative to each other in the direction of the main axis, i.e., at right angles to the plane of the grating.

It is apparent that the photoelectric position indicator comprises an elongate scale phase grating 1, having transverse grooves and lands, at least one scanning phase grating 2 having grooves and lands which are parallel to those of said scale phase grating, at least one light source 3, a collimator 4, and a plurality of photodetectors 5, 6, 7, 8. Said at least one scanning phase grating, said at least one light source, said collimator, and said photodetectors are included in a scanning unit, which is movable relative to said scale phase grating along the latter. Said at least one light source is energizable to emit light through said collimator onto said phase gratings. Said at least one scanning phase grating is adapted to diffract said light from said collimator along said scale phase grating, whereby interference patterns having groups having predetermined orders of diffraction are generated by the light which has thus been diffracted three times during a movement of said scanning unit along said scale phase grating. Each of said photodetectors is arranged to receive one of said groups having a predetermined order of diffraction. Said photodetectors are operable to generate phase-displaced periodic actual-value signals, in dependence on intensity changes of said groups. The scanning unit comprises light-directing optical means 9, which are arranged to receive light from said collimator before said light is incident on one of said phase gratings and to fan said light along said grooves and lands of said scale phase grating so as to form two component light beams 12, 13. Said photodetectors comprise two sets of photodetectors 5, 6 and 7, 8. The photodetectors of each of said sets are arranged to receive said groups having respective predetermined orders of diffraction of said interference patterns generated by one of said component beams 12 and 13.

I claim:

1. In a photoelectric position indicator comprising
 a scale phase grating having transverse grooves and lands,
 at least one scanning phase grating, having transverse grooves and lands extending parallel to those of said scale phase grating,
 at least one light source,
 a collimator, and
 a plurality of photodetectors,
 wherein said at least one scanning phase grating, said at least one light source, said collimator and said photodetectors are included in a scanning unit mounted to be movable relative to said scale phase grating along the latter in a measuring direction, and
 said at least one light source is energizable to emit light through said collimator onto said phase gratings,
 said phase gratings are adapted to diffract said light from said collimator along said measuring direction,
 whereby interference patterns having groups having predetermined orders of diffraction are generated by the light which has thus been diffracted several times during a movement of said scanning unit along said measuring direction,
 wherein each of said photodetectors is arranged to receive one of said groups having a predetermined order of diffraction, and
 said photodetectors are operable to generate phase-displaced periodical actual-value signals in dependence on the orders of diffraction of said groups,
 the improvement residing in that
 said scanning unit comprises light-directing optical means arranged to receive light from said light source to fan said light transverse to the measuring direction so as to form component light beams, said light-directing optical means comprising a phase grating having lands and grooves which are substantially at right angles to those of said scale phase grating,
 said photodetectors comprise sets of photodetectors, and
 the photodetectors of each of said sets are arranged to receive said groups having respective predetermined orders of diffraction of said interference patterns generated by one of said component beams.

2. The improvement set forth in claim 1, wherein
 said phase grating of said light-directing means has a land width to groove width ratio of 1:1, and
 said grooves of said phase grating of said light-directing means predominantly diffracts light in directions of diffraction of the +1st and −1st orders.

3. The improvement set forth in claim 1, wherein
 said phase grating of said light-directing optical means has a principal plane and is mounted to be adjustable by a rotation about an axis which is normal to said principal plane.

4. The improvement set forth in claim 1, wherein
 said at least one scanning phase grating comprises a phase grating which is combined with said phase grating of said light-directing optical means to form a crossed grating.

5. The improvement set forth in claim 4, wherein said crossed grating comprises two sets of lands and grooves crossing each other at an angle which differs from 90°.

6. The improvement set forth in claim 5, wherein said sets of lands and grooves cross each other at an angle of 45°.

7. In a photoelectric position indicator comprising
 a scale phase grating having transverse grooves and lands,
 at least one scanning phase grating, having transverse grooves and lands extending parallel to those of said scale phase grating,
 at least one light source,
 a collimator, and
 a plurality of photodetectors,
 wherein said at least one scanning phase grating, said at least one light source, said collimator and said photodetectors are included in a scanning unit mounted to be movable relative to said scale phase grating along the latter in a measuring direction, and
 said at least one light source is energizable to emit light through said collimator onto said phase gratings,
 said phase gratings are adapted to diffract said light from said collimator along said measuring direction,
 whereby interference patterns having groups having predetermined orders of diffraction are generated by the light which has thus been diffracted several times during a movement of said scanning unit along said measuring direction,
 wherein each of said photodetectors is arranged to receive one of said groups having a predetermined order of diffraction, and said photodetectors are operable to generate phase-displaced periodical actual-value signals in dependence on the orders of diffraction of said groups, the improvement residing in that said scanning unit comprises light-directing optical means arranged to receive light from said light source to fan said light transverse to the measuring direction so as to form component light beams, said light-directing optical means being arranged to form said component light beams so that they diverge along said scale phase grating only to such a small extent that said component beams are incident on said phase scale grating on substantially overlapping areas, said photodetectors comprise sets of photodetectors, and the photodetectors of each of said sets are arranged to receive said groups having respective predetermined orders of diffraction of said interference patterns generated by one of said component beams.

* * * * *